No. 724,041. PATENTED MAR. 31, 1903.
J. RENNER.
SHADE ROLLER SUPPORT.
APPLICATION FILED FEB. 13, 1902.
NO MODEL.
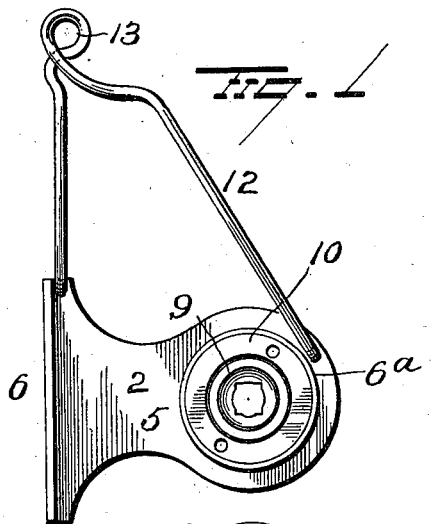
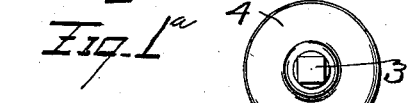
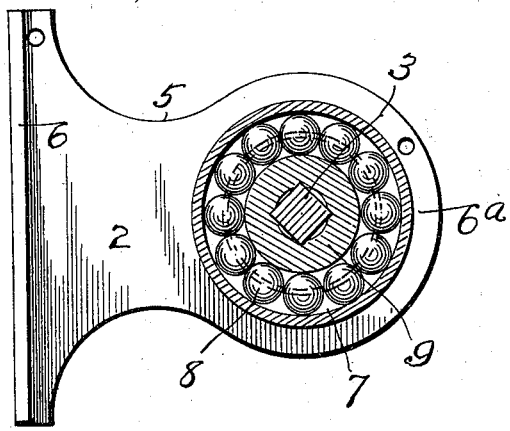
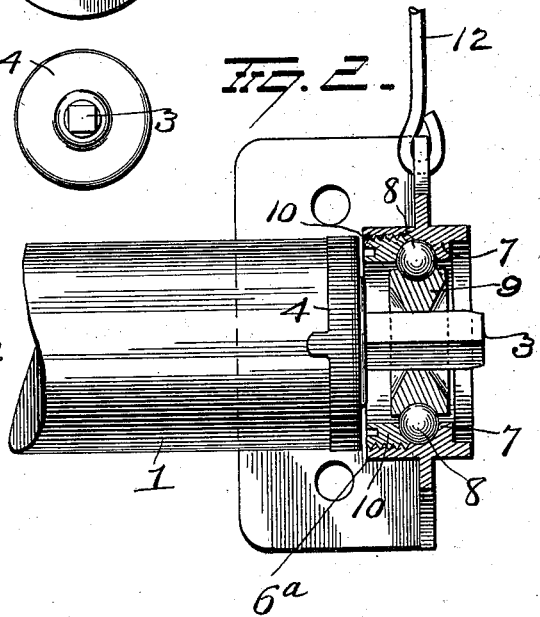
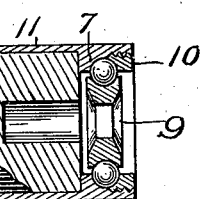
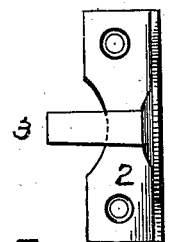
WITNESSES
INVENTOR
J. Renner
By H. A. Seymour
Attorney

UNITED STATES PATENT OFFICE.

JOHN RENNER, OF BURLINGTON, IOWA.

SHADE-ROLLER SUPPORT.

SPECIFICATION forming part of Letters Patent No. 724,041, dated March 31, 1903.

Application filed February 13, 1902. Serial No. 93,831. (No model.)

*To all whom it may concern:*

Be it known that I, JOHN RENNER, a resident of Burlington, in the county of Des Moines and State of Iowa, have invented certain new and useful Improvements in Shade-Roller Supports; and I do hereby declare the following to be a full, clear, and exact description of the invention, such as will enable others skilled in the art to which it appertains to make and use the same.

My invention relates to an improved shade-roller support, and more particularly to an improved bracket, the object of the invention being to provide an improved roller-bearing for a shade-roller and so mount the same as to insure easy running of the roller when in operative position, yet permit of the easy removal of the roller and the roller-bearing mechanism.

With this object in view the invention consists in certain novel features of construction and combinations and arrangements of parts, as will be more fully hereinafter described, and pointed out in the claims.

In the accompanying drawings, Figure 1 is a view illustrating my improvements. Fig. 1ª is an end view of the roller. Fig. 2 is a view in section. Fig. 3 is a view in section, taken at right angles to Fig. 2; and Figs. 4 and 5 are views illustrating a modified form of my invention.

1 represents an ordinary shade-roller, and 2 my improved bracket therefor. The roller 1 is provided on its end with an angular spindle or trunnion 3, which may be secured to the roller by being driven or screwed therein or in any other manner, and a metal cap 4 is preferably secured on this end of the roller to strengthen the same and present a smooth surface to the bracket.

The bracket 2 comprises a standard 5, having a bent flange or lip 6 at its inner end to secure the bracket in position by means of screws or nails passed therethrough and into the window-casing or other support, and the outer end of the standard is perforated by an integral sleeve 6ª, having an integral flange 7 in one end made with a grooved runway in its inner face for ball-bearings 8, and the opposite end of said sleeve is internally screw-threaded, as shown. A ring 9 is provided with a grooved periphery to run on the ball-bearings 8, and a screw-threaded ring 10, having a curved groove in its inner face to form a portion of the runway for the balls, is adapted to be screwed into the threaded end of the sleeve and also serves to prevent displacement of the ring 9. This threaded ring 10 is made with notches in its outer face to receive a spanner-wrench to screw it home or remove the same.

The ring 9 is made with an angular central opening to receive the angular spindle or trunnion 3 and compel the turning of the ring on the ball-bearings when the roller is operated, thus resulting in an antifriction-bearing therefor and insure a perfect running of the roller, but at the same time permit of the easy removal of the shade-roller when desired.

In Figs. 4 and 5 I have illustrated a modification of my invention, in which form the sleeve 11 (carrying the roller-bearings and ring 9 precisely as above explained) is secured to the end of the roller 1 and the angular spindle 3 is secured to the bracket, the operation of this device being like the preferred form of my invention. Also as a means of suspending the brackets to facilitate raising and lowering the roller and shade I have shown in Figs. 1 and 2 an upwardly-projecting wire bracket 12, bent at its ends and passed through holes in bracket 2 to secure them together and bent between its ends to form an eye 13 for the attachment of the supporting-cord or other device.

A great many other slight changes and alterations might be made in the general form and arrangement of the several parts described without departing from my invention, and hence I do not limit myself to the precise details set forth, but consider myself at liberty to make such slight changes and alterations as fairly fall within the spirit and scope of my invention.

Having fully described my invention, what I claim as new, and desire to secure by Letters Patent, is—

1. The combination of a shade-roller, a supporting-bracket therefor, a sleeve secured to one of said parts and having an internal flange, a removable ring screwed into said sleeve and coöperating with the flange therein to form a runway for balls, a ring encircled by said sleeve and having a peripheral groove, said ring also having an angular opening, the balls mounted on the peripheral groove of the ring and in the runway in the sleeve, said balls preventing lateral displacement of the ring within the sleeve, and an angular spindle on the other of said parts to enter the angular opening in the ring.

2. The combination with a shade-roller bracket and means in one end thereof for supporting the spindle or journal of a shade-roller of a wire bracket projecting upwardly from the shade-roller bracket, said wire bracket bent between its ends to form an eye and having two arms projecting downwardly from said eye and attached respectively to respective ends of the shade-roller bracket.

In testimony whereof I have signed this specification in the presence of two subscribing witnesses.

JOHN RENNER.

Witnesses:
CHAS. C. CLARK,
MARY FAWCETT.